United States Patent
Hughes et al.

(10) Patent No.: US 10,318,640 B2
(45) Date of Patent: Jun. 11, 2019

(54) IDENTIFYING RISKY TRANSLATIONS

(71) Applicant: Facebook, Inc., Menlo Park, CA (US)

(72) Inventors: William Arthur Hughes, San Francisco, CA (US); Matthias Gerhard Eck, San Francisco, CA (US); Kay Rottmann, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/192,076

(22) Filed: Jun. 24, 2016

(65) Prior Publication Data
US 2017/0371867 A1    Dec. 28, 2017

(51) Int. Cl.
*G06F 17/28* (2006.01)
*G06F 17/27* (2006.01)
*G10L 15/26* (2006.01)

(52) U.S. Cl.
CPC ...... *G06F 17/2854* (2013.01); *G06F 17/2818* (2013.01)

(58) Field of Classification Search
CPC ............... G06F 17/289; G06F 17/2872; G06F 17/2785; G06F 9/4448; G10L 15/265
See application file for complete search history.

(56) References Cited

U.S. PATENT DOCUMENTS

| | | | | |
|---|---|---|---|---|
| 5,293,584 | A * | 3/1994 | Brown | G10L 15/18 704/200 |
| 5,855,000 | A * | 12/1998 | Waibel | G06K 9/03 382/186 |
| 6,356,865 | B1 * | 3/2002 | Franz | G10L 15/26 704/2 |
| 7,539,619 | B1 * | 5/2009 | Seligman | G06F 17/2755 704/2 |
| 8,326,598 | B1 * | 12/2012 | Macherey | G06F 17/289 704/4 |
| 9,652,454 | B2 * | 5/2017 | Wu | G06F 17/2854 |
| 9,678,939 | B2 * | 6/2017 | Bahgat | G06F 17/271 |
| 9,747,281 | B2 * | 8/2017 | Zhao | G06F 17/289 |
| 9,753,918 | B2 * | 9/2017 | Waibel | G10L 13/043 |
| 2004/0039563 | A1 * | 2/2004 | Suzuki | G06F 17/2872 704/2 |

(Continued)

FOREIGN PATENT DOCUMENTS

CN    101320366 A  *  12/2008

*Primary Examiner* — Anne L Thomas-Homescu

(57) ABSTRACT

Exemplary embodiments provide techniques for evaluating when words or phrases of a translation were generated with a low degree of confidence, and conveying this information when the translation is presented. For example, if a source language word is encountered in source material for translation, but the source language word was only encountered a few times (or not at all) in the training data used to train the translation system, then the resulting translation may be flagged as being of low confidence. Other situations, such as the generation of two equally-likely translations, or translation system model disagreement, may also indicate a questionable translation. When the translation is displayed, questionable words and phrases may be flagged, and possible alternative translations may be presented. If one of the alternatives is selected, this information may be used to update the translation system's models in order to improve translation quality in the future.

18 Claims, 10 Drawing Sheets

(56) References Cited

U.S. PATENT DOCUMENTS

| | | | | |
|---|---|---|---|---|
| 2005/0038643 A1* | 2/2005 | Koehn | G06F 17/2818 | 704/2 |
| 2005/0049851 A1* | 3/2005 | Watanabe | G06F 17/2827 | 704/2 |
| 2005/0137855 A1* | 6/2005 | Maxwell, III | G06F 17/2881 | 704/9 |
| 2007/0043567 A1* | 2/2007 | Gao | G06F 17/2827 | 704/257 |
| 2009/0281789 A1* | 11/2009 | Waibel | G06F 17/2735 | 704/3 |
| 2009/0326912 A1* | 12/2009 | Ueffing | G06F 17/2818 | 704/2 |
| 2010/0131260 A1* | 5/2010 | Bangalore | G06F 17/279 | 704/3 |
| 2010/0185434 A1* | 7/2010 | Burvall | G06F 17/289 | 704/3 |
| 2011/0301935 A1* | 12/2011 | Quirk | G06F 17/2827 | 704/2 |
| 2012/0131031 A1* | 5/2012 | Xie | G06F 17/30672 | 707/765 |
| 2012/0253785 A1* | 10/2012 | Hamid | G06F 17/2229 | 704/4 |
| 2012/0278060 A1* | 11/2012 | Cancedda | G06F 17/2818 | 704/2 |
| 2013/0124492 A1* | 5/2013 | Gao | G06F 17/273 | 707/706 |
| 2013/0144592 A1* | 6/2013 | Och | G06F 17/273 | 704/2 |
| 2013/0144593 A1* | 6/2013 | Och | G06F 17/2845 | 704/2 |
| 2013/0144597 A1* | 6/2013 | Waibel | G06F 17/28 | 704/2 |
| 2013/0197896 A1* | 8/2013 | Chalabi | G06F 17/2735 | 704/2 |
| 2013/0238312 A1* | 9/2013 | Waibel | G10L 15/00 | 704/8 |
| 2014/0163951 A1* | 6/2014 | Nikoulina | G06F 17/2809 | 704/4 |
| 2014/0172407 A1* | 6/2014 | Eden | G06F 17/2809 | 704/2 |
| 2014/0200878 A1* | 7/2014 | Mylonakis | G06F 17/2818 | 704/4 |
| 2014/0288913 A1* | 9/2014 | Shen | G06F 17/289 | 704/2 |
| 2014/0303960 A1* | 10/2014 | Orsini | G06F 17/2854 | 704/2 |
| 2014/0358519 A1* | 12/2014 | Mirkin | G06F 17/2854 | 704/3 |
| 2015/0154184 A1* | 6/2015 | Bahgat | G06F 17/271 | 704/2 |
| 2015/0286634 A1* | 10/2015 | Shin | G06F 17/289 | 704/2 |
| 2015/0378989 A1* | 12/2015 | Wu | G06F 9/4448 | 704/3 |
| 2016/0132491 A1* | 5/2016 | Watanabe | G06F 17/2827 | 704/4 |
| 2016/0140111 A1* | 5/2016 | Mirkin | G06F 17/289 | 704/2 |
| 2016/0267077 A1* | 9/2016 | Bahgat | G06F 17/289 | |
| 2016/0267200 A1* | 9/2016 | Guo | G06F 17/30973 | |
| 2016/0357731 A1* | 12/2016 | Zorzin | G06F 17/2785 | |
| 2017/0031901 A1* | 2/2017 | Song | G06F 17/2705 | |
| 2017/0060854 A1* | 3/2017 | Zeng | G06F 17/2705 | |
| 2017/0060855 A1* | 3/2017 | Song | G06F 17/2818 | |
| 2017/0075883 A1* | 3/2017 | Kamatani | G06F 17/2836 | |
| 2017/0076199 A1* | 3/2017 | Zhang | G06F 17/2827 | |
| 2017/0124071 A1* | 5/2017 | Huang | G06F 17/2818 | |
| 2017/0161264 A1* | 6/2017 | Zhao | G06F 17/289 | |
| 2017/0169015 A1* | 6/2017 | Huang | G06F 17/2854 | |
| 2017/0220562 A1* | 8/2017 | Yamauchi | G06F 17/2827 | |
| 2017/0323016 A1* | 11/2017 | Feng | G06F 17/30828 | |
| 2017/0337189 A1* | 11/2017 | Shin | G06F 17/2785 | |

* cited by examiner

The United States seeks to expand the permanent diplomatic friction
that has with Venezuela

*FIG. 2B*

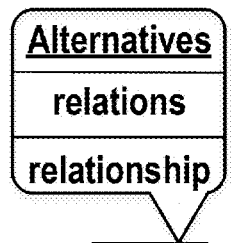

The United States seeks to expand the permanent diplomatic friction
that has with Venezuela

*FIG. 2C*

The United States seeks to expand the permanent diplomatic friction
that has with Venezuela

*FIG. 2D*

The United States seeks to expand the permanent diplomatic friction
that has with Venezuela

*FIG. 2E*

IDENTIFYING RISKY TRANSLATIONS

BACKGROUND

Machine translations involve the translation of information from a source language to a destination language via a computing device. Machine translations may be used to translate, for example, advertisements, government documents, academic works, text messages and emails, social networking posts, recordings of spoken language, and numerous other works.

SUMMARY

The present application is related to techniques for evaluating when words or phrases of a translation were generated with a low degree of confidence, and conveying this information when the translation is presented.

According to exemplary embodiments, several indicators may be used to identify when a translation has been generated with a low degree of confidence. If a source language word is encountered in source material for translation, but the source language word was only encountered a few times (or not at all) in the training data used to train the translation system, then the resulting translation may be flagged as being of low confidence. Alternatively or in addition, the translation system may generate two hypotheses as to how the word may be translated, and the two hypotheses may each represent substantially equally likely options. Furthermore, in some embodiments the translation system may employ two or more models, and the two or more models may be in disagreement as to which translation is correct. Any of these situations may cause the translated word or phrase to be flagged as being a questionable translation.

When the translation is displayed, questionable words and phrases may be flagged, for example by highlighting the words or phrases, marking the words and phrases in a different color, underlining the words or phrases, etc. The translation system may track different degrees of confidence in the translation of the words and phrases (e.g., low confidence, very low confidence, etc.), and may reflect this information in the presentation of the translation. For example, words translated with low confidence may be marked with light red, whereas words generated with very low confidence may be marked with dark red.

In some embodiments, possible alternative translations may be presented. If one of the alternatives is selected, this information may be used to update the translation system's models in order to improve translation quality in the future.

In further embodiments, the system may also track which words and phrases were translated with a high degree of confidence. This information may also be presented when the translation is presented.

These and other features and advantages will be described in more detail with reference to the attached drawings.

BRIEF DESCRIPTION OF THE DRAWINGS

FIGS. 2A-2E depict examples of visually distinguishing destination words generated with low and high confidence, according to exemplary embodiments.

DETAILED DESCRIPTION

Exemplary embodiments relate to identifying words and phrases in a machine-generated translation that were translated with a low degree of confidence. These words and phrases are flagged in a presentation of the translation to identify them as low confidence translations for a user.

Machine translations may rely on one or more models to generate a translation. The models may be trained using training data. As the models are used to generate translations, the models may be refined and new training data may be added. As a result, the models may improve over time. However, in the interim, there may be words and phrases that the models are incapable of translating, or are capable of translating, but with a low probability of generating a correct translation. During this period, the models are effectively making a guess as to which translation is correct.

However, a user may have no way of knowing which portions of a translation were generated with a high degree of confidence, and which represent the models' best guess in an ambiguous situation. This can be especially problematic when an incorrect guess is made that changes the meaning of the translation. Even in the best of circumstances, an incorrect guess may be confusing to a user.

Some interfaces present a confidence indicator that shows the translations system's degree of confidence in the translation as a whole. However, such a system fails to identify which portions of the translation were generated with a high or low degree of confidence. As a result, the translation system may have a high degree of confidence in the translation as a whole, but there may be individual words that were incorrectly generated. An indication of a high degree of confidence may falsely assure a user that the incorrectly generated words are accurate. Even if the translation system indicates that it has low confidence in the translation as a whole, the user may not be made aware of which portions of the translation are likely to be incorrect. This may cause the user to discount the entire translation, even though only a few words may have been generated with low confidence. Moreover, whole-translation confidence indicators may be difficult for a user to interpret.

Figure 1:
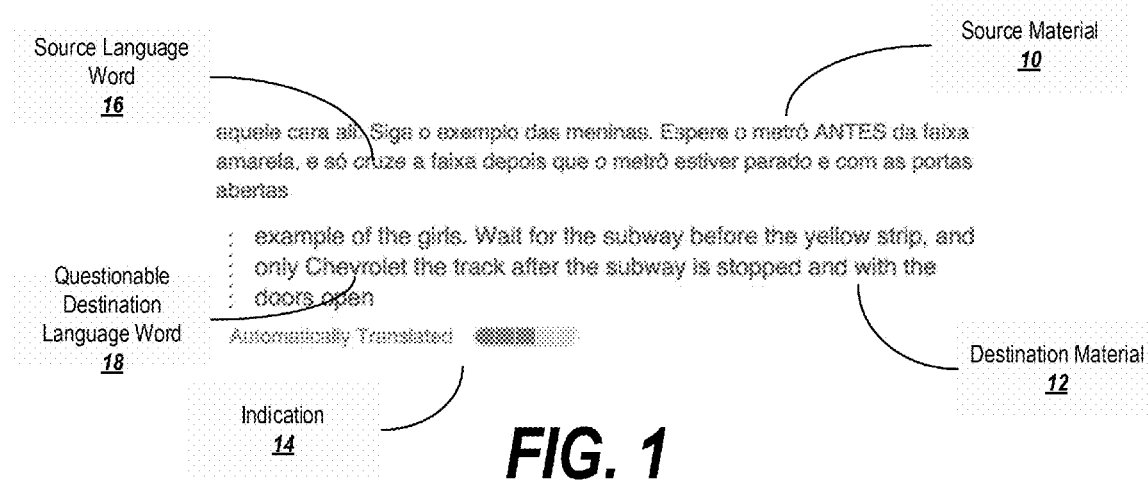
FIG. 1 depicts an example of translation including destination language words generated with a low confidence.

For example, FIG. 1 shows an interface that presents source material 10 in Spanish, and destination material 12 representing a machine translation of the source material 10 into English. An indication 14 is presented that the destination material 12 was automatically translated from the source material, and includes a rating of the translation system's degree of confidence in the translation.

In this case, the translation system has an average level of confidence (a rating of three out of five) in the translation. This information may be ambiguous to a user. For example, it is not clear whether every word in the destination material 12 was generated with an average degree of confidence, or whether half the words were generated with high confidence and half were generated with low confidence. Alternatively, perhaps most of the words were generated with high confidence, and only one word was generated with very low confidence.

In this case, the source material 10 did include a source language word 16 ("cruze") that caused difficulty for the translation system. The translations system translated this word as the destination language word 18 "Chevrolet." This could occur for a number of reasons. For example, perhaps the translation system was trained with training data in which the sentence "I bought a new Cruze" (where a "Cruze" is a model of car made by Chevrolet) was matched with the Spanish equivalent of "Compré un nuevo chevrolet," meaning "I bought a new Chevrolet." This may have been one of the few times that the word "cruze" appeared in the training data, and accordingly the translation system translated the word "cruze" into "Chevrolet" in the example of FIG. 1.

In this case, the user may be able to determine, based on the English translation, that the word "Chevrolet" is probably not the correct word, and that the correct word is probably "cross." However, in many cases an incorrect translation may not be so clear, and the correct word to use may be ambiguous based on the surrounding text.

Figure 2A:
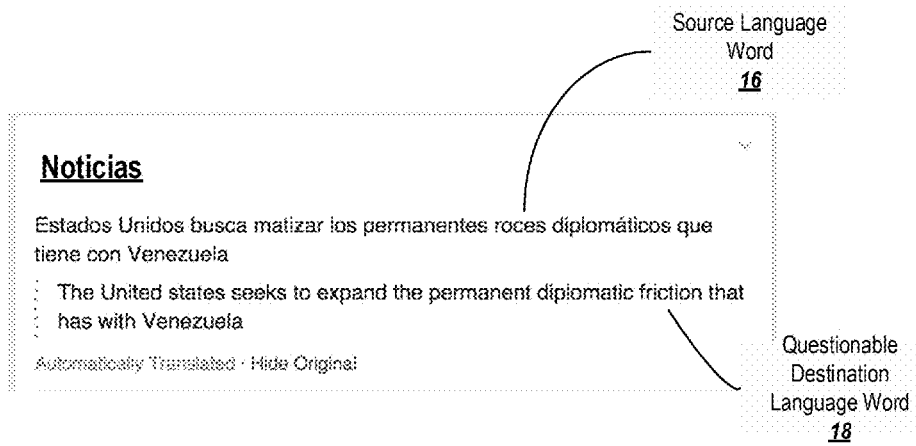

For example, FIG. 2A depicts an interface similar to the one discussed above in connection with FIG. 1. The interface includes original source language material in Spanish, and translated destination language material in English. In this example, the source language material includes a source language word 16 ("roces") that was translated into a questionable destination language word 18 ("friction"). As can be seen in FIG. 2A, in the context of the translation as a whole, the word "roces" would probably have been better translated as "relations," which represents an alternative translation for the source language word 16.

In this case, the translation system applied an underlying translation model that is trained on bilingual training data. The bilingual training data includes pairs of equivalent words, phrases, sentences, etc. in the source language and the destination language (e.g., on the order of 10 million training pairs). The translation model analyzes the bilingual training data and determines the frequency that one word (e.g., "roces") was translated into another word (e.g., "friction," "relations," or "relationship"). In this example, the translation model may have generated the following probabilities based on the occurrence of each pair (roces/friction, roces/relations, and roces/relationship) in the training data:
friction: 0.3
relations: 0.25
relationship: 0.2

Because "friction" was the most common translation of "roces" in the training data, the translation "roces"→"friction" received the highest score and was applied in the translation. However, although the alternatives ("relations" and "relationship") were encountered less frequently, they were not significantly less likely to occur. Because other alternatives of substantially the same likelihood exist, the translation "roces"→"friction" represents a relatively low-confidence translation.

Compare this example to a translation "Unión Europea"→"European Union." When the term "Unión Europea" was encountered in the training data, it was likely translated into "European Union" every time, or nearly every time. Accordingly such a translation would probably have a high score (e.g., 0.9 or 1.0), whereas any alternatives (which may have been the result of an incorrect translation in the training data) would probably have a much lower score. (e.g., 0.1 or 0.05). This large difference between the most likely candidate and the next-most-likely alternative indicates a relatively high-confidence translation.

The confidence in a translation can be communicated to a user in a number of ways. According to exemplary embodiments, when the translation is presented, low-confidence and/or high-confidence translated words, phrases, etc. may be visually distinguished from the other words or phrases of the translation. This may involve, for example, highlighting the words, changing a color or typography of the words, underlining the words, and other techniques for distinguishing one word from another.

For example, FIG. 2B depicts an embodiment in which the low-confidence word in the translation (i.e., "friction") is highlighted. The highlighting may be done in a color that indicates low confidence, such as red.

Optionally, if a user selects the highlighted word or hovers a cursor over the highlighted word, alternative translations may be displayed. FIG. 2C depicts an example of such an interface. In this example, alternatives to the original translation of "friction" are shown and are available for selection by a user. The alternatives may be drawn from the above-described translation model. For example, any hypotheses whose probabilities or scores are within a predetermined range or amount of the selected most-likely hypothesis may be presented as an alternative.

If a user selects one of the alternatives shown in FIG. 2C, this information may be used to improve the translation system. For example, the scores, parameters, probabilities, etc. applied by the language model and/or the translation model of the translation system may be adjusted to make it more likely that the selected alternative will be used in translations in the future.

FIG. 2D depicts a further embodiment in which translations having different degrees of confidence are visually distinguished in different ways. In this example, the translation system has a very low confidence in the translation of the word "friction." For example, a confidence score for this term (reflecting the availability of alternatives, the number of times this particular translation was encountered during training, etc.) may be below a first threshold value. The translation system also has a low level of confidence in the translation of the term "permanent." However, the system is more confident in the translation of the term "permanent" than in the translation of the term "friction." For example, the confidence score for the term "permanent" may be below a second predetermined threshold that is higher than the first predetermined threshold. To reflect the low-but-not-very-low confidence level, the term "permanent" is also visually distinguished by highlighting (e.g., in red), but the degree of visual distinguishing is less (e.g., the term "permanent" is highlighted in light red, whereas the term "friction" is highlighted in dark red). Other forms or relative distinguishing are also possible.

In addition to visually distinguishing low-confidence translations, the translation system may also visually distinguish high-confidence translations. FIG. 2E shows an example in which the terms "United States" and "Venezuela" were translated with a high degree of confidence (e.g. indicating a large number of training examples, no alternatives of substantially the same likelihood, a high level of inter-model agreement, etc.). Accordingly, these terms are visually distinguished in another manner (e.g., by highlighting them in green).

These and other features of exemplary embodiments are described in more detail below. Before further discussing the exemplary embodiments, however, a general note regarding data privacy is provided.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Next, an overview of the machine translation system is provided.

Machine Translation System

Figure 3:
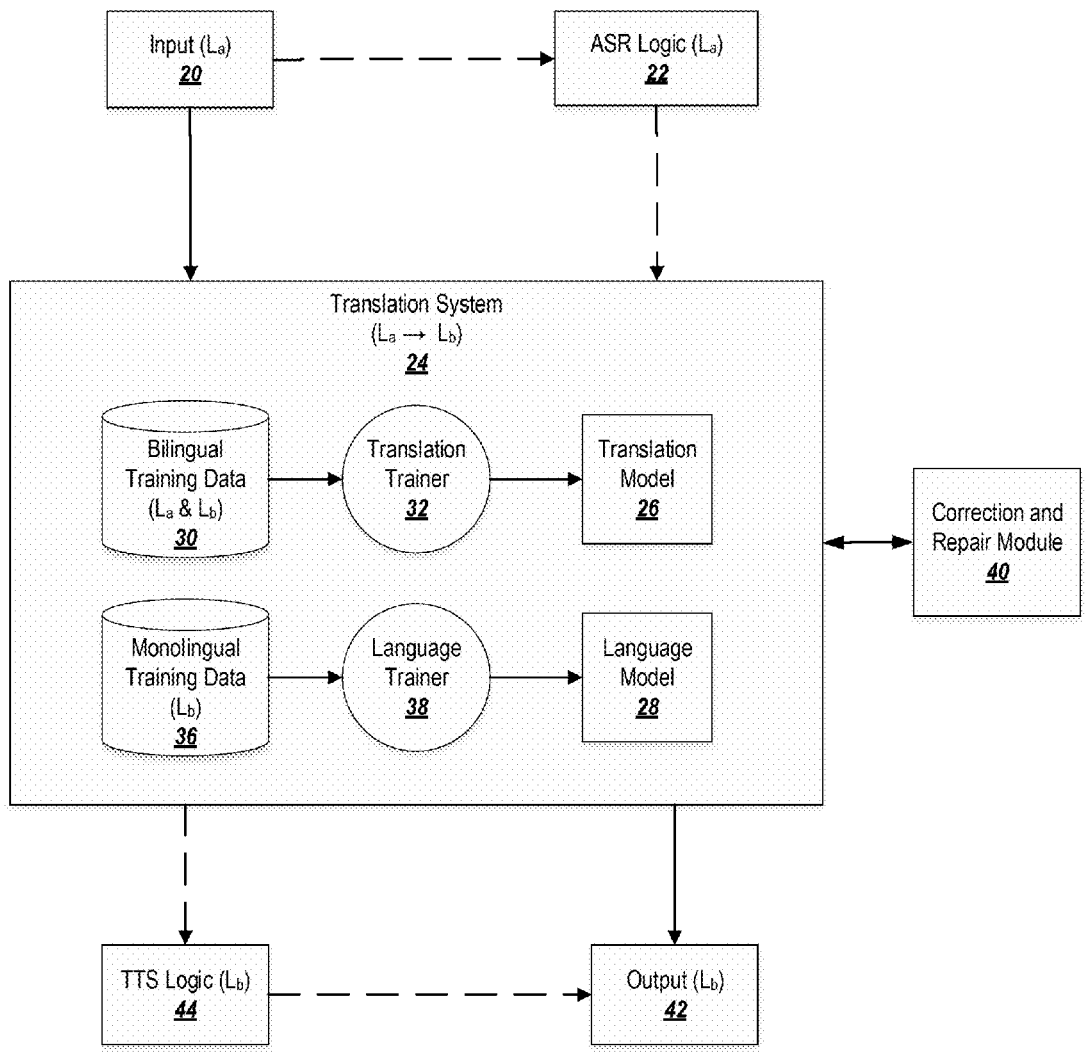
FIG. 3 depicts an exemplary translation system.

FIG. 3 is a block diagram overview of an example of a translation system suitable for use with exemplary embodiments. FIG. 3 depicts a unidirectional system in which a translation is performed from $L_a$ to $L_b$; however, the present invention is not so limited. The translation system may be bidirectional, performing translation in both directions (from $L_a$ to $L_b$ and from $L_b$ to $L_a$). Moreover, a multi-directional system involving several languages $L_1 \ldots L_n$ could equally benefit from the present invention.

An input 20 may be provided to the machine translation system. The input 20 may be in the form of text in the source language $L_a$, such as text input from a keyboard via a web browser or application. The input 20 may also take other forms, such as an audio recording, writing provided directly to a computing system through a stylus or electronic pen, writing indirectly provided to a computing system (e.g., by scanning a handwritten or typed document), a photograph (e.g., a photograph of a sign), and other suitable types of input. In order to provide the input 20, a user may interact with the system via a graphical user interface displayed on a computing device screen (or active touch screen), a pointing device such as a mouse or pen, a microphone, and/or a keyboard.

In some embodiments, the translation system 24 is operable to translate textual information from the source language $L_a$ to the destination language $L_b$. Accordingly, in order to handle multiple different types of inputs 20, logic may be provided for converting the input 20 into text. For example, FIG. 3 depicts automatic speech recognition (ASR) logic 33 that is configured to convert input audio in the source language $L_a$ into text in the source language $L_a$. In order to convert an audio recording to text, the ASR logic may utilize an acoustic model, an ASR (e.g., class-based) language model, and a recognition lexicon model. One example of suitable ASR logic is the "Ninja" speech recognizer system developed at Mobile Technologies, LLC. Other types of ASR logic that may be used include speech recognizers developed by IBM Corporation, SRI, BBN, the University of Cambridge, or Aachen University.

Other types of logic may be provided for other types of inputs 20 (e.g., optical character recognition logic for converting input handwriting or typing, image analysis logic for converting input photographs, etc.). If the translation system operates on something other than text (e.g., audio), suitable logic may be provided for converting the input 20 into a format recognizable to the translation system.

The input 20 is provided to a translation system 24 (potentially after being processed by the ASR logic 22 or other suitable logic). The translation system 24 is configured to translate the input 20 from the source language $L_a$ into the destination language $L_b$. Examples of translation systems 24 suitable for use with exemplary embodiments include the "PanDoRA" system developed at Mobile Technologies. LLC, as well as machine translation systems developed by IBM Corporation, SRI, BBN or at Aachen University.

Generally, the translation system 24 applies a translation model 26 to source language words, phrases, sentences, etc. in the input 16 in order to develop a list of plausible candidate destination language words, phrases, sentences, etc. that may represent a translation of the source language material. The list of candidate destination language words, phrases, sentences, etc. are referred to as translation hypotheses. After generating a list of hypotheses, the list may be subjected to further analysis by a language model 28. The language model 28 considers the context in which the hypotheses are used in the destination language $L_b$, and selects one of the hypotheses as the most likely translation of the source material.

The translation model 26 may be, for example, a phrase table with entries for each hypothesis. Each entry may include a source language word, phrase, sentence, etc. and a paired destination language word, phrase, sentence, etc. Each entry may be associated with a score that represents the likelihood, in general, that the destination language portion of the pair is the translation of the source language portion of the pair. For illustration purposes, an example of a phrase table is shown in Table 1, below.

TABLE 1

| Source Material | Destination Material | Score |
| --- | --- | --- |
| Good | Gut | 0.7 |
| Good | Guten | 0.5 |
| Good | gültig | 0.1 |

The source/destination pairs in the phrase table may be generated from bilingual training data 30. The bilingual training data 30 may include words, phrases, sentences, etc. that have been previously translated from the source language $L_a$ to the destination language $L_b$ (or vice versa). The score in the phrase table may represent a frequency at which the source/destination pairs were found to correspond to each other in the bilingual training data 40. A translation trainer 32 include logic to analyze the bilingual training data 30 and create or modify entries in the phrase table based on the analysis.

As noted above, the translation model 26 produced by the translation trainer 32 may be well-suited to generating an initial list of hypotheses indicative or possible translations for the source material. However, the translation model 26 typically does not take context into account. For example, Table 1 above shows that, in general, the word "Good" was translated into "Gut" slightly more often than it was translated into "Guten;" nonetheless, both are reasonably plausible hypotheses. Thus, without any context, it may be difficult to determine which translation is the most likely. However, assume that the previous word was translated as "Sehr" ("Very"). In German, it is much more likely that the word after "Sehr" should be translated as "Gut," rather than "Guten." In order to take this information into account, a language model 28 provides one or more tuning scores that allow the initial phrase table score to be supplemented or replaced in view of the words and phrases surrounding a particular candidate hypothesis. When presented with new information for translation, the translation system 24 may generate an initial list of hypotheses using the translation model 26, and then may select the most likely translation from among the list of hypotheses using the tuning scores provided by the language model 28.

For illustration purposes, an example of a table of probabilities applied by a language model 28 is shown in Table 2, below.

TABLE 1

| Hypothesis under Consideration \| Previous Word/Phrase Analyzed | Probability |
|---|---|
| house \| the white | 0.8 |
| home \| the white | 0.01 |

The language model 28 used to translate a source language $L_a$ into a destination language $L_b$ is a language model 28 for the destination language $L_b$. The language model 28 may be trained using monolingual training data 36 for the destination language $L_b$. The monolingual training data 36 may be any suitable list of words, phrases, sentences, etc. from the destination language $L_b$. For example, the monolingual training data 36 may include publications, articles, or literature from the destination language $L_b$, and/or may include text collected from various sources (e.g., social networking posts, assuming that the author's privacy settings allow for the collection of such data). A language trainer 38 may include logic configured to analyze the monolingual training data 36 and to generate one or more tuning scores based on the occurrence of words, phrases, etc. based on their placement with respect to one another.

In some embodiments, a correction and repair module 40 employing correction logic may be provided. The correction and repair module 40 allows the user to correct the translation system 24 output via multiple modalities; including speech, gesture, writing, tactile, touch-sensitive and keyboard interfaces, and enables the system to learn from the user's corrections. The correction and repair module may be of the type such as that disclosed in U.S. Pat. No. 5,855,000.

User field customization logic may provide an interface for users to add new vocabulary to the system, and can also select an appropriate system vocabulary for their current situation. For example, a change in system vocabulary may be triggered by a change in location, as determined by the GPS coordinates indicating the current location of the user's device, or an explicit selection of task or location by the user.

The Correction and Repair Module 40 records and logs any corrections the user may make, which can be later used to update ASR logic 22 and translation system 24. If the correction contains a new vocabulary item, or if the user enters the field customization mode to explicitly add a new word to the system, or if a new word is automatically detected in the input audio using confidence measures or new word models, such as the method described in Thomas Schaaf, "Detection of OOV words using generalized word models and a semantic class language model," in Proc. of Eurospeech, 2001, the new vocabulary item or word may be added to the translation model 26 and/or the language model 28.

After applying the translation model 26 and/or the language model 28 to the input 20, the translation system 24 may generate an output 42 in the destination language $L_b$. The output 42 may be in a textual format and may be presented on a display device. In some embodiments, the output 42 may be automatically presented (e.g., an automatic translation or "autotranslation"). In other embodiments, a prompt may be presented and the user may request that the translation be shown. The translation may remain hidden until the user manually requests that the translation be presented.

If it is desirable to provide the output 42 in a format other than text, then logic may be employed for converting the output 42 into the desired format. For example, FIG. 3 depicts text-to-speech (TTS) logic 44 for converting the text generated by the translation system 24 into an audio recording. The TTS logic 44 generates audio output for an output device, such as a speaker. Examples of suitable TTS logic 44 include the Cepstral TTS module. Other TTS modules, such as TTS modules which support Windows SAPI (speech application programming interface) conventions, could also be employed.

Model Training

Figure 4:
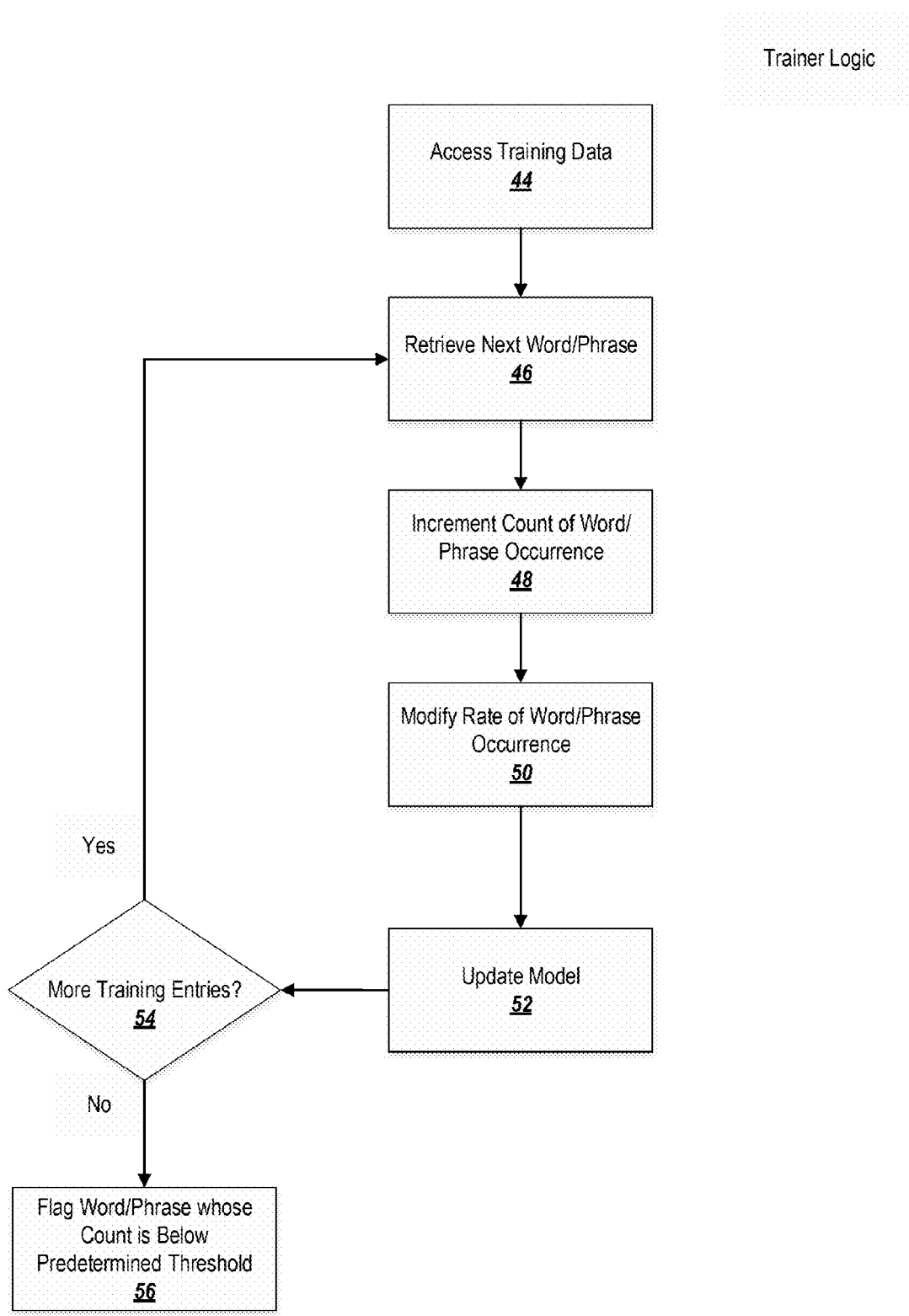
FIG. 4 is a flowchart describing an exemplary process for training one or more models applied by a translation system.

Determining whether some translations are generated with high or low confidence may begin when the translation model 26 and/or the language model 28 are trained or updated. FIG. 4 depicts a process for training one or more models, which accounts for translation confidence.

The process begins at step 44, where a trainer 32, 38 corresponding to the model may access training data. For example, if the model being trained is the translation model 26, then the translation trainer 32 may access the bilingual training data 30. If the model being trained is the language model 28, the language trainer 38 may access the monolingual training data 36.

At step 46, the trainer may retrieve the next entry in the training data. If the training data is the bilingual training data 30, the next entry may include a word/phrase/sentence pair including material in the source language and material in the destination language. If the training data is the monolingual training data 36, the next entry may include a word/phrase/sentence in the destination language.

At step 48, the trainer may increment a count that indicates a number of times the word/phrase/sentence (or a portion of entry, such as a word within a sentence) was encountered. This count may be used to determine whether the word/phrase/sentence was encountered sufficient times so that a confident translation may be generated.

At step 50, the trainer may recalculate a rate of occurrence of the word/phrase sentence. At step 52, this information may be entered into a phrase table for the translation model 26 (e.g., Table 1) or may be used to update the probabilities in the language model 28 (e.g., Table 2).

Processing may then proceed to step 54, and the trainer may determine whether any more training entries exist in the training data. If so, processing may return to step 46, and the next entry may be retrieved.

If the determination at step 54 is "no," then processing may proceed to step 56. At this step, the trainer may optionally evaluate the word counts generated at step 48 and determine whether any of the counts are below a predetermined threshold indicating a low confidence. Generally, fewer than about 5-10 training examples indicates a low confidence in the resulting translation. A predetermined threshold for high confidence may also be used, in the event that any words/phrases received a relatively large count. Multiple thresholds may be used for different levels of high or low confidence. The trainer may set a flag on entries in the translation model's 26 phrase table, or the list of probabilities in the language model 28, where the flag indicates high or low confidence in the entry and/or a degree of confidence.

Figure 5A:
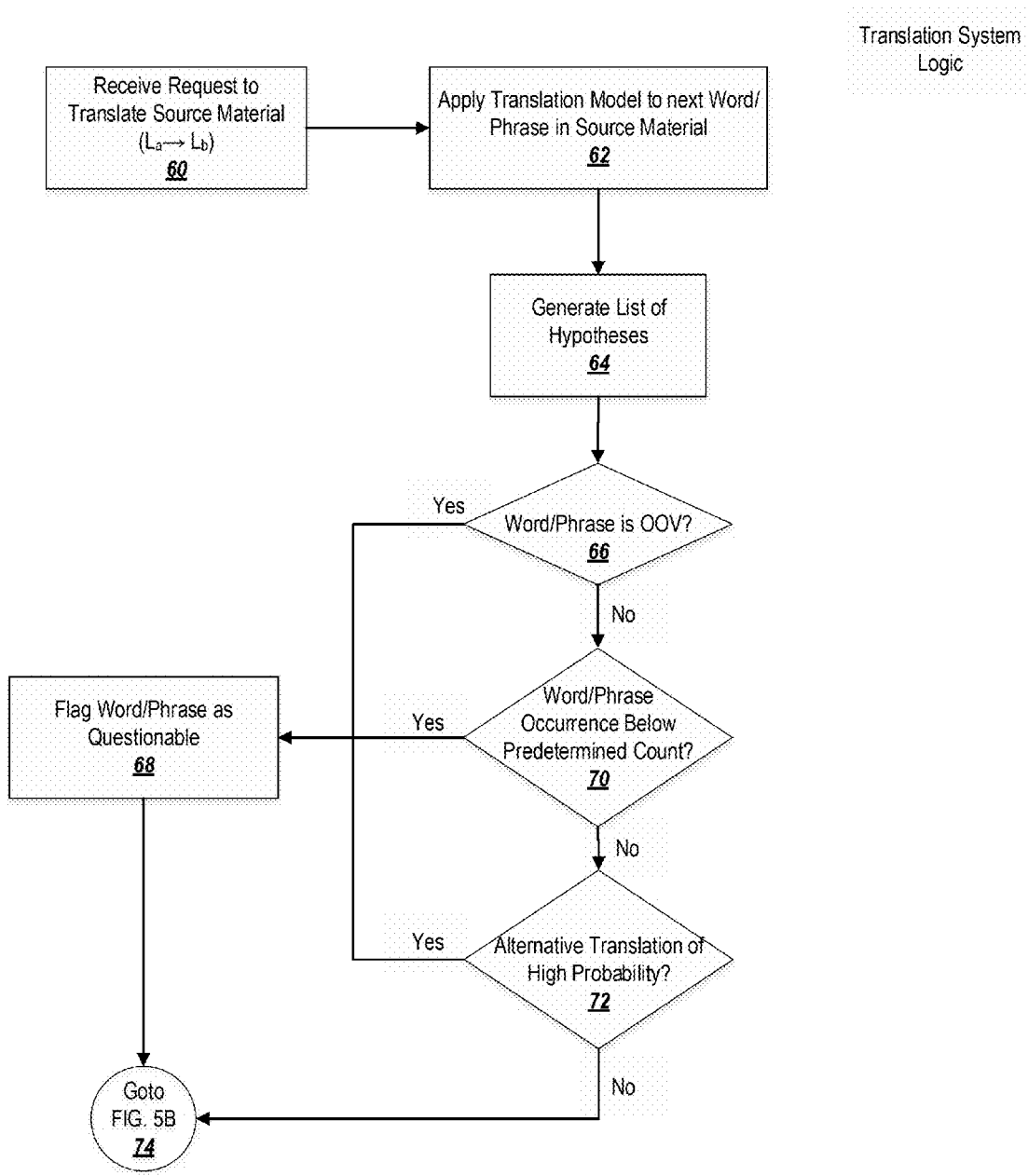
FIGS. 5A-5C are flowcharts depicting an exemplary process for identifying and distinguishing translated words and phrases that were generated with low confidence.
Figure 5B:
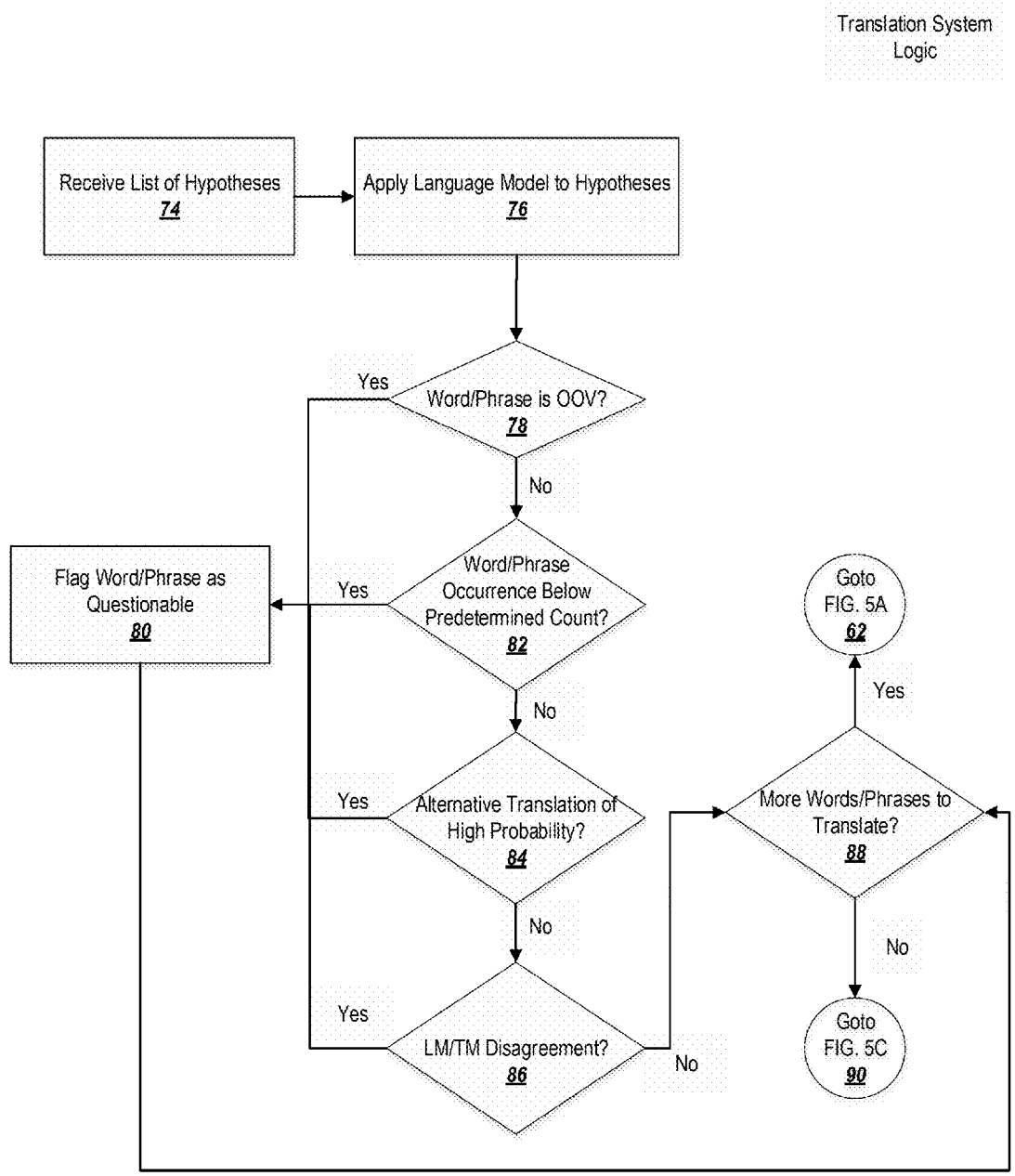
Figure 5C:
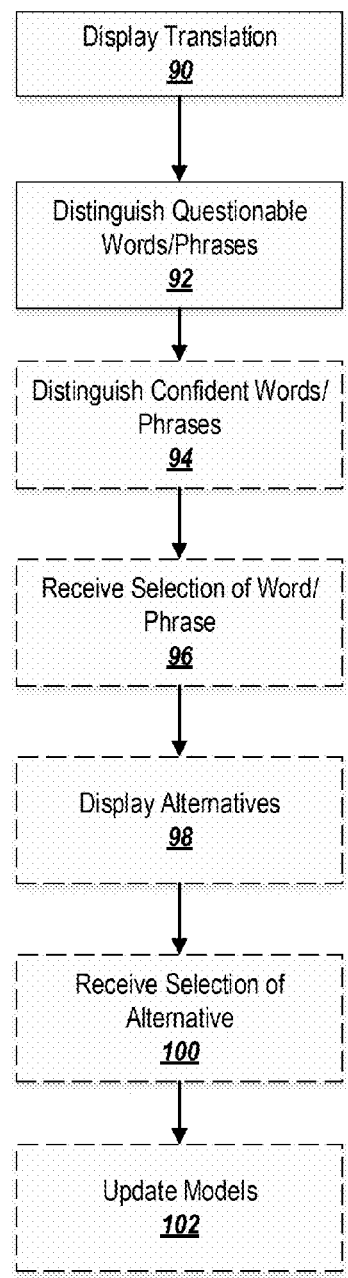

The information gathered in FIG. 4 may be used when a new translation request is received to determine a degree of confidence in fulfilling the request. FIGS. 5A-5C depict an exemplary technique for fulfilling a translation request and indicating a level of confidence in words/phrases/sentences in the resulting translation.

Identifying and Flagging Risky Translations

The steps depicted in FIGS. 5A-5C may be embodied as logic executed by the translation system 24. The process begins in FIG. 5A at step 60, when the translation system 24 receives a request to translate source material from a source language into a destination language.

At step 62, the translation system 24 may apply the translation model 26 to the next word or phrase in the source material. The translation model 26 may receive the word or phrase and may, for example, compare the word or phrase to entries in the translation model's 26 phrase table. One or more entries in the phrase table may correspond to the source language word or phrase, and at step 64 the translation model 26 may generate a list of hypotheses representing possible translations of the source language word or phrase. Each entry in the list of hypotheses may be associated with a score or probability indicating a likelihood or probability that the translation model 26 assigns to the entry in the list.

In some cases, the translation model 26 may encounter a word or phrase which was not present in any of the bilingual training data 30. Such a word or phrase is considered to be out of the vocabulary ("OOV") of the translation model 26. Different translations systems 24 may respond to OOV words and phrases in different ways; one common technique is to leave the OOV word or phrase untranslated (i.e., a source language version of the word or phrase appears in the destination language translation). If a word or phrase is OOV, then the translation model 26 has a very low confidence in translating the word or phrase. Accordingly, at step 68 the word or phrase may be flagged as questionable.

If the word or phrase was in-vocabulary, then at step 70 the translation system 24 may determine whether the word/phrase occurrence in the bilingual training data 30 was below a predetermined count. For example, if the word or phrase was flagged as questionable at step 56 in FIG. 4, then the entry of the translation model 26 (e.g., in the phrase table) may contain a flag indicating that the word/phrase occurrence was below the predetermined count. Otherwise, the number of word/phrase occurrences may be stored elsewhere (e.g., along with the bilingual training data 30), and may be consulted at step 70 to determine whether the word/phrase was encountered more than the predetermined number of times. If the word/phrase occurrence was below the predetermined count, then processing may proceed to step 68 and the word/phrase may be flagged as questionable. Otherwise, processing may proceed to step 72.

At step 72, the translation system 24 may determine whether alternative translations of high probability exist in the list of hypotheses. For example, the translation system 24 may retrieve the score or probability associated with the most-likely hypothesis in the list generated at step 64 (e.g., by retrieving the probability from the phrase table). The translation system 24 may determine whether any of the other hypotheses are associated with a score that is within a predetermined amount or predetermined ratio of the most-likely hypothesis. If so, processing may proceed to step 68 and the word/phrase may be flagged as questionable. If not, then processing may proceed to step 74.

In some embodiments, if at any point the word or phrase is flagged as questionable according to any of the criteria at steps 66, 70, and 72, then processing may proceed directly from step 68 to step 74.

Step 74 is addressed in FIG. 5B. At step 74, the list of hypotheses may be sent, along with scores and/or relative rankings of the hypotheses, to the language model 28. The language model 28 may be applied to the list of hypotheses at step 76. For example, the probabilities in the language model 28 (see Table 2, above) may be applied based on the word or phrase in the list of hypotheses and other words in the context of the translation (e.g., words that have already been translated up to this point, such as the last-translated word or phrase). The language model 28 may re-rank the hypotheses according to their probabilities in the language model 28.

It is possible that the language model 28 did not encounter a word/phrase in the list of hypotheses in the monolingual training data 36. If so, then the word/phrase is out of vocabulary for the language model 28. Note that it is possible for a word or phrase to be OOV for the translation model 26 or the language model 28 separately, or for both (depending on the specific content of the bilingual training data 30 and the monolingual training data 36). At step 78, the translation system 24 may evaluate whether words or phrases in the list of hypotheses are OOV for the language model 28. If so, processing may proceed to step 80, and the word or phrase may be flagged as questionable.

Otherwise, processing may proceed to step 82, and the translation system 24 may determine whether the word or phrase occurrence in the monolingual training data 36 was below a predetermined count. For example, if the word or phrase was flagged as questionable at step 56 in FIG. 4, then the entry of the language model 28 may contain a flag indicating that the word/phrase occurrence was below the predetermined count. Otherwise, the number of word/phrase occurrences may be stored elsewhere (e.g., along with the monolingual training data 36), and may be consulted at step 82 to determine whether the word/phrase was encountered more than the predetermined number of times. If the word/phrase occurrence was below the predetermined count, then processing may proceed to step 80 and the word/phrase may be flagged as questionable. Otherwise, processing may proceed to step 84.

At step 84, the translation system 24 may determine whether alternative translations of high probability exist in the re-ranked list of hypotheses as determined by the probabilities in the language model 28. For example, the translation system 24 may retrieve the score or probability associated with the most-likely hypothesis in the list as it was re-ordered at step 76 (e.g., by retrieving the probability from the language model 28). The translation system 24 may determine whether any of the other hypotheses are associated with a score that is within a predetermined amount or predetermined ratio of the most-likely hypothesis. If so, processing may proceed to step 80 and the word/phrase may be flagged as questionable. If not, then processing may proceed to step 86.

At step 86, the translation system 24 may determine whether the language model and the translation model are in disagreement with each other. For example, if the translation model 26 assigned a relatively high probability or score to a hypothesis, but the language model 28 assigned a relatively low probability score to the same hypothesis (or vice versa), then the language model 28 and the translation model 26 may be in disagreement. Alternatively or in addition, if one model suggests that a hypothesis is a clear front-runner (e.g., the probability of on hypothesis is significantly above all other hypotheses) but the other models suggest that the probability is more evenly distributed (or that a different hypothesis is significantly more likely), the models may be in disagreement.

If the models are found to be in disagreement at step 86, then processing may proceed to step 80 and the words or phrases over which the models disagree may be flagged as questionable. Otherwise, processing may proceed to step 88 and the translation system 24 may determine whether additional words, phrases, or sentences remain to be translated. If so, then processing returns to step 62 (FIG. 5A) and the next word or phrase is retrieved. If not, processing proceeds to step 90 (FIG. 5C).

Having translated the source material, at step 90 the translation system 24 may display the resulting translation. The translation may be displayed in a user interface, such as an application interface for a social networking application. The translation may be displayed with an indication that the translated was automatically generated.

At step 92, the translation system may visually distinguish any words or phrases in the translation that were flagged as questionable in FIGS. 5A-5B. for example, any words or phrases marked as questionable may be underlined, colored, highlighted, may have their typeface modified, etc. to distinguish them from other non-questionable words or phrases.

It is noted that the above-described steps may be applied in the opposite direction to identify high-confidence translations. For example, at steps 70 and 82, the words or phrases may be evaluated to determine whether their occurrence in the training data was above a predetermined threshold. Such a finding may indicate a high degree of confidence in the translation. Similarly, if no alternative translations having a similarly high probability exist, or if the translation model 26 and language model 28 are in agreement, this may indicate a high degree of confidence.

Accordingly, at step 94 the translation system 24 may optionally visually distinguish any words or phrases that were translated with high confidence.

Optionally, at step 96 the translation system 24 may receive a selection of one of the words or phrases that were visually distinguished at step 92. At step 98, the translation system may display one or more alternatives for the selected word. For example, the translation system 24 may consult the original list of hypotheses generated at step 64, and may present a predetermined number of the most highly-ranked alternative hypotheses. Alternatively, the translation system 24 may consult the re-ordered list of hypotheses generated at step 76, and may present a predetermined number of the most highly-ranked alternative hypotheses.

The translation system may receive a selection of one of the alternative hypotheses at step 100. For example, a user may interact with the user interface through an input device, such as a mouse or touch screen, to indicate a selection of one of the alternatives. The display of the translation may be updated to replace the questionable word or phrase with the selection received at step 100.

The selection made at step 100 may be used to update or improve the translation model 26 and/or the language model 28. For example, one or more weights, scores, parameters, probabilities. etc. associated with the models may be updated to make it more likely that the selected alternative will be used (as compared to the original questionable translation) in future translations.

It is noted that, instead of making a binary determination of confidence and flagging a word or phrase as questionable at various steps, a confidence score may be calculated throughout the process. For example, if a word or phrase was encountered very few times in the language model, the score may be decreased. If the word or phrase was encountered many times in the translation model, the score may be increased. The score may be compared to a minimum threshold to determine whether the translation is questionable, or compared to an upper threshold to determine whether the translation system 24 is highly confident in the translation. The score may be consulted at step 92 to determine whether to visually distinguish the words or phrases in the translation.

Network Embodiments

Figure 6:
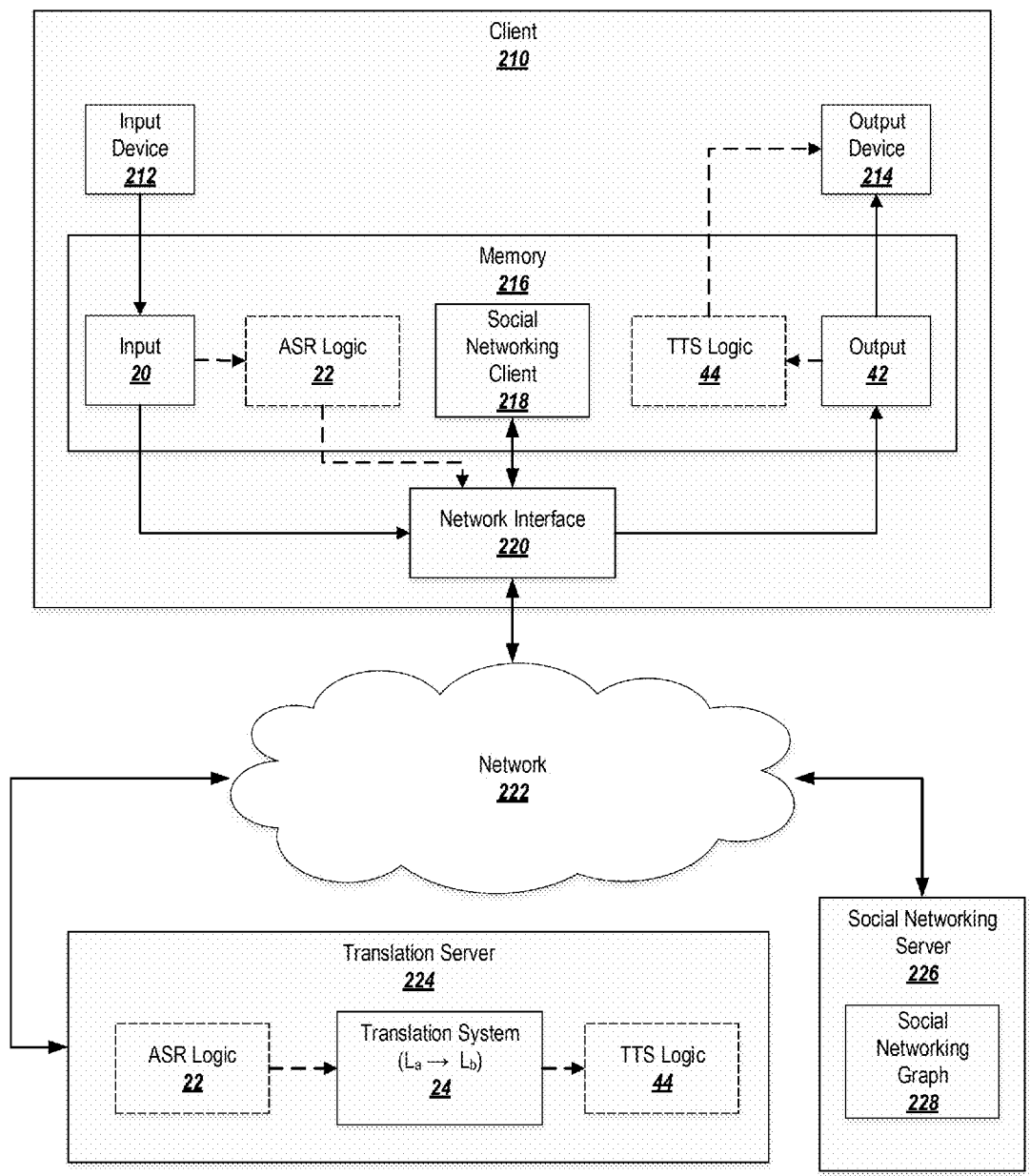
FIG. 6 depicts an exemplary network embodiment.

Some exemplary embodiments may be employed in a network environment, such as the environment depicted in FIG. 6.

A user may interact with a client 210, which may be (for example) a personal computer, tablet, mobile phone, special-purpose translation device, etc. In some embodiments, the client 210 does not require interaction from a user.

The client 210 may include one or more input devices 212 and one or more output devices 214. The input devices 212 may include, for example, microphones, keyboards, cameras, electronic pens, touch screens, and other devices for receiving an input in a source language $L_a$. The output devices 214 may include a speaker, a display device such as a monitor or touch screen, and other devices for presenting an output in a destination language $L_b$.

In some embodiments, the input from the input devices 212 may be in the form of an input 20 that is being sent to a translation system 24 for translation. In other embodiments, the client 210 may also submit training data, a phrase table, a translation, or a translation and the original source data used to generate the translation.

The client 210 may include a memory 216, which may be a non-transitory computer readable storage medium, such as one or a combination of a hard drive, solid state drive, flash storage, read only memory, or random access memory. The memory 216 may a representation of an input 20 and/or a representation of an output 42, as well as one or more applications. For example, the memory 216 may store a social networking client 218 that allows a user to interact with a social networking service.

The input 20 may be textual, such as in the case where the input device 212 is a keyboard. Alternatively, the input 20 may be an audio recording, such as in the case where the input device 212 is a microphone. Accordingly, the input 20 may be subjected to automatic speech recognition (ASR) logic 22 in order to transform the audio recording to text that is processable by the translation system 24. As shown in FIG. 6, the ASR logic 22 may be located at the client device 210 (so that the audio recording is processed locally by the client 210 and corresponding text is transmitted to the translation server 224), or may be located remotely at the translation server 224 (in which case, the audio recording may be transmitted to the translation server 224 and the translation server 224 may process the audio into text). Other combinations are also possible—for example, if the input device 212 is a touch pad or electronic pen, the input 20 may be in the form of handwriting, which may be subjected to handwriting or optical character recognition analysis logic in order to transform the input 20 into processable text.

Similarly, a resulting output 42 from a translation system 24 may be in the form of text. In some embodiments, the desirable end form of the output may be something other than text, such as an audio representation of the translation. Accordingly, the output 42 may be subjected to text-to-speech (TTS) logic 44 in order to transform the text into an audio recording that is presentable by the output devices 214. As shown in FIG. 6, the TTS logic 44 may be located at the client device 210 (so that the output text is processed locally by the client 210 and corresponding audio is sent to the output devices 214), or may be located remotely at the translation server 224 (in which case, text may be processed at the translation server 224 and the resulting audio recording may be transmitted to the client 210). Other combinations of processing logic are also possible, depending on the desired final form for the output 42.

The client 210 may be provided with a network interface 220 for communicating with a network 222, such as the Internet. The network interface 220 may transmit the input 20 in a format and/or using a protocol compatible with the network 222 and may receive a corresponding output 28 from the network 222.

The network interface 220 may communicate through the network 222 to a translation server 224. The translation server 224 may host the above-described translation system 24. The translation system 24 may translate the input 20 into an output 42.

The network interface 220 of the client 210 may also be used to communicate through the network 222 with a social networking server 226. The social networking server 226 may include or may interact with a social networking graph 228 that defines connections in a social network. Furthermore, the translation server 224 may connect to the social networking server 226 for various purposes, such as retrieving training data from the social network.

A user of the client 210 may be an individual (human user), an entity (e.g., an enterprise, business, or third-party application), or a group (e.g., of individuals or entities) that interacts or communicates with or over the social-networking server 226. The social-networking server 226 may be a network-addressable computing system hosting an online social network. The social-networking server 226 may generate, store, receive, and send social-networking data, such as, for example, user-profile data, concept-profile data, social-graph information, or other suitable data related to the online social network. The social-networking server 226 may be accessed by the other components of the network environment either directly or via the network 222.

The social-networking server 226 may include an authorization server (or other suitable component(s)) that allows users to opt in to or opt out of having their actions logged by social-networking server 226 or shared with other systems (e.g., third-party systems, such as the translation server 224), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 226 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 100 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 226 may send a request to the data store for the object. The request may identify the user associated with the request. The requested data object may only be sent to the user (or a client system 210 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described translation system. Targeting criteria used to identify and target users may include explicit, stated user interests on social-networking server 226 or explicit connections of a user to a node, object, entity, brand, or page on social-networking server 226. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 7:
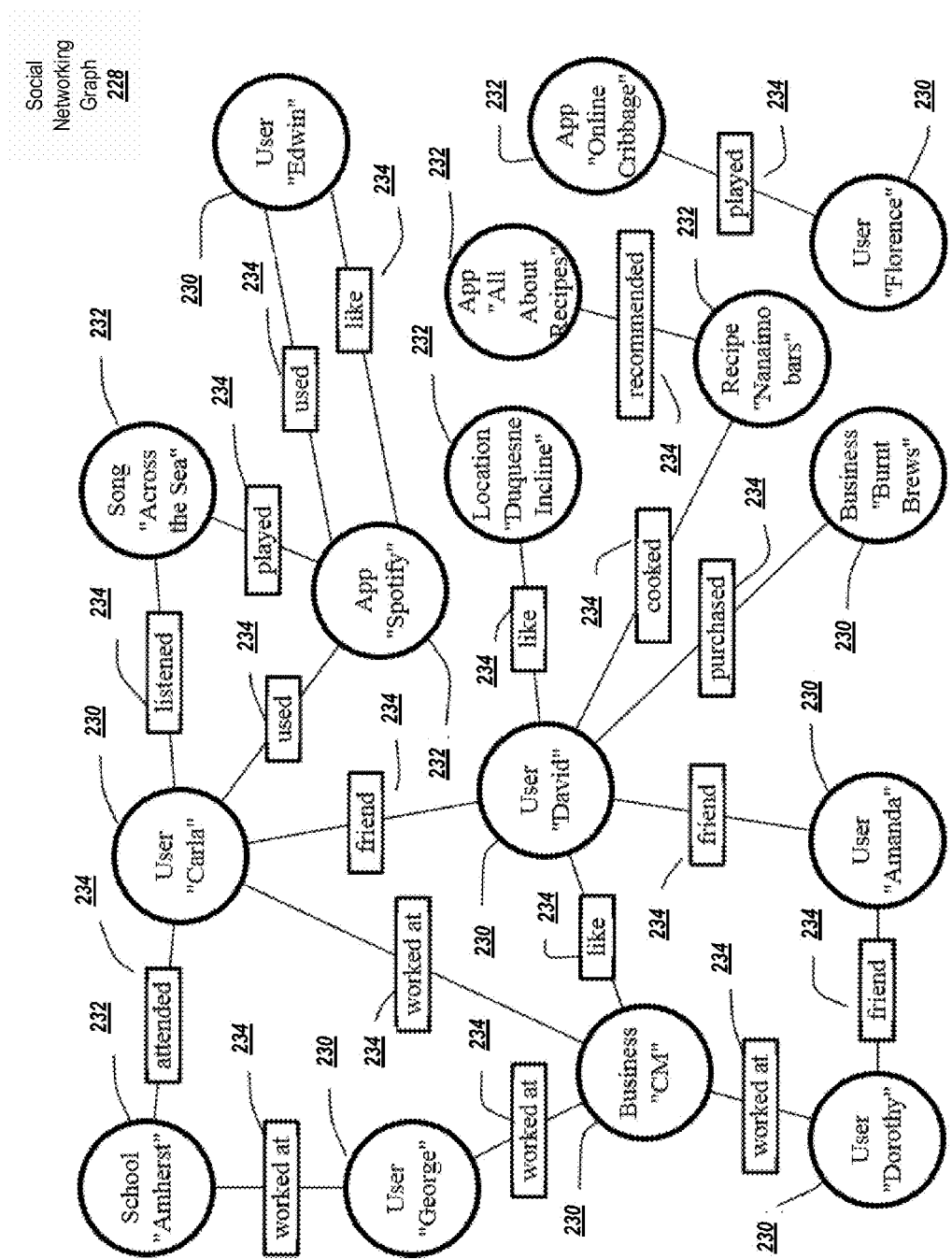
FIG. 7 describes the social networking graph depicted in FIG. 6 in more detail.

FIG. 7 illustrates an example of a social graph 228. In exemplary embodiments, a social-networking service may store one or more social graphs 228 in one or more data stores as a social graph data structure via the social networking service.

The social graph 228 may include multiple nodes, such as user nodes 230 and concept nodes 232. The social graph 228 may furthermore include edges 234 connecting the nodes. The nodes and edges of social graph 228 may be stored as data objects, for example, in a data store (such as a social-graph database). Such a data store may include one or more searchable or queryable indexes of nodes or edges of social graph 228.

The social graph 228 may be accessed by a social-networking server 226, client system 210, third-party system (e.g., the translation server 224), or any other approved system or device for suitable applications.

A user node 230 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 230 corresponding to the user, and store the user node 30 in one or more data stores. Users and user nodes 230 described herein may, where appropriate, refer to registered users and user nodes 230 associated with registered users. In addition or as an alternative, users and user nodes 230 described herein may, where appropriate, refer to users that have not registered with the social-networking system. In particular embodiments, a user node 230 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 230 may be associated with one or more data objects corresponding to information associated with a user. In particular embodiments, a user node 230 may correspond to one or more webpages. A user node 230 may be associated with a unique user identifier for the user in the social-networking system.

In particular embodiments, a concept node 232 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 232 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 232 may be associated with one or more data objects corresponding to information associated with concept node 232. In particular embodiments, a concept node 232 may correspond to one or more webpages.

In particular embodiments, a node in social graph 228 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 232. Profile pages may be viewable by all or a selected subset of other users. As an example and not by way of limitation, a user node 230 may have a corresponding user-profile page in which the corresponding user may add content, make declarations, or otherwise express himself or herself. A business page such as business page 205 may comprise a user-profile page for a commerce entity. As another example and not by way of limitation, a concept node 232 may have a corresponding concept-profile page in which one or more users may add content, make declarations, or express themselves, particularly in relation to the concept corresponding to concept node 232.

In particular embodiments, a concept node 232 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 230 corresponding to the user and a concept node 232 corresponding to the third-party webpage or resource and store edge 234 in one or more data stores.

In particular embodiments, a pair of nodes in social graph 228 may be connected to each other by one or more edges 234. An edge 234 connecting a pair of nodes may represent a relationship between the pair of nodes. In particular embodiments, an edge 234 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 234 connecting the first user's user node 230 to the second user's user node 230 in social graph 228 and store edge 234 as social-graph information in one or more data stores. In the example of FIG. 7, social graph 228 includes an edge 234 indicating a friend relation between user nodes 230 of user "Amanda" and user "Dorothy." Although this disclosure describes or illustrates particular edges 234 with particular attributes connecting particular user nodes 230, this disclosure contemplates any suitable edges 234 with any suitable attributes connecting user nodes 230. As an example and not by way of limitation, an edge 234 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 228 by one or more edges 234.

In particular embodiments, an edge 234 between a user node 230 and a concept node 232 may represent a particular action or activity performed by a user associated with user node 230 toward a concept associated with a concept node 232. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 232 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 234 and a "used" edge (as illustrated in FIG. 7) between user nodes 230 corresponding to the user and concept nodes 232 corresponding to the song and application to indicate that the user listened to the song and used the application. Moreover, the social-networking system may create a "played" edge 234 (as illustrated in FIG. 7) between concept nodes 232 corresponding to the song and the application to indicate that the particular song was played by the particular application. In this case, "played" edge 234 corresponds to an action performed by an external application (SPOTIFY) on an external audio file (the song "Across the Sea"). Although this disclosure describes particular edges 234 with particular attributes connecting user nodes 230 and concept nodes 232, this disclosure contemplates any suitable edges 234 with any suitable attributes connecting user nodes 230 and concept nodes 232. Moreover, although this disclosure describes edges between a user node 230 and a concept node 232 representing a single relationship, this disclosure contemplates edges between a user node 230 and a concept node 232 representing one or more relationships. As an example and not by way of limitation, an edge 234 may represent both that a user likes and has used at a particular concept. Alternatively, another edge 234 may represent each type of relationship (or multiples of a single relationship) between a user node 230 and a concept node 232 (as illustrated in FIG. 7 between user node 230 for user "Edwin" and concept node 232 for "SPOTIFY").

In particular embodiments, the social-networking system may create an edge 234 between a user node 230 and a concept node 232 in social graph 228. As an example and not by way of limitation, a user viewing a concept-profile page (such as, for example, by using a web browser or a special-purpose application hosted by the user's client system) may indicate that he or she likes the concept represented by the concept node 232 by clicking or selecting a "Like" icon, which may cause the user's client system to send to the social-networking system a message indicating the user's liking of the concept associated with the concept-profile page. In response to the message, the social-networking system may create an edge 234 between user node 230 associated with the user and concept node 232, as illustrated by "like" edge 234 between the user and concept node 232. In particular embodiments, the social-networking system may store an edge 234 in one or more data stores. In particular embodiments, an edge 234 may be automatically formed by the social-networking system in response to a particular user action. As an example and not by way of limitation, if a first user uploads a picture, watches a movie, or listens to a song, an edge 234 may be formed between user node 230 corresponding to the first user and concept nodes 232 corresponding to those concepts. Although this disclosure describes forming particular edges 234 in particular manners, this disclosure contemplates forming any suitable edges 234 in any suitable manner.

The social graph 228 may further comprise a plurality of product nodes. Product nodes may represent particular products that may be associated with a particular business. A business may provide a product catalog to a consumer-to-business service and the consumer-to-business service may therefore represent each of the products within the product in the social graph 228 with each product being in a distinct product node. A product node may comprise information relating to the product, such as pricing information, descriptive information, manufacturer information, availability information, and other relevant information. For example, each of the items on a menu for a restaurant may be represented within the social graph 228 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 228. The information for a product node may be manipulated by the social-networking system as a product object that encapsulates information regarding the referenced product.

As such, the social graph 228 may be used to infer shared interests, shared experiences, or other shared or common attributes of two or more users of a social-networking system. For instance, two or more users each having an edge to a common business, product, media item, institution, or other entity represented in the social graph 228 may indicate a shared relationship with that entity, which may be used to suggest customization of a use of a social-networking system, including a messaging system, for one or more users.

Computer-Related Embodiments

Figure 8:
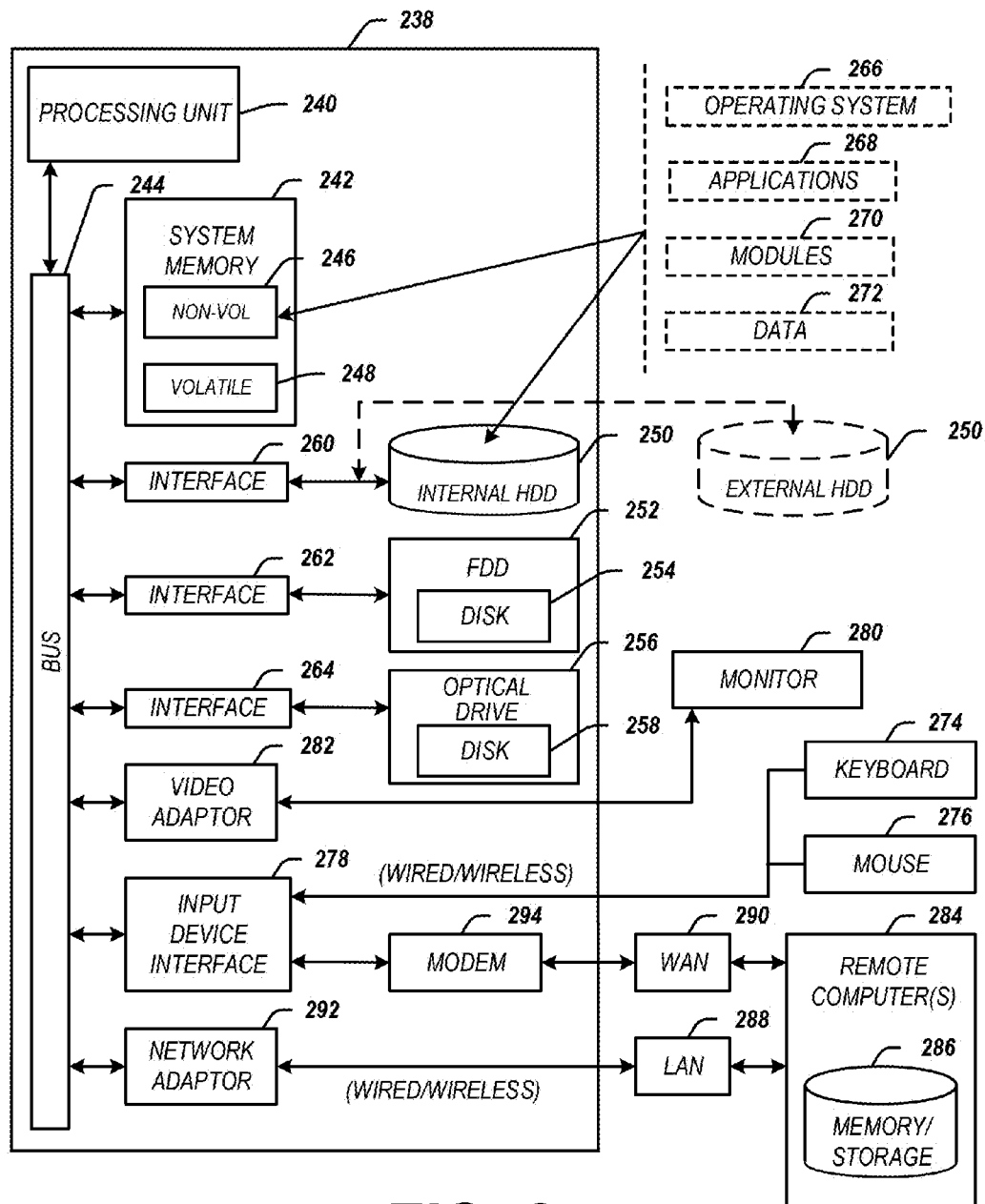
FIG. 8 depicts an exemplary computing device suitable for use with exemplary embodiments.

The above-described methods may be embodied as instructions on a computer readable medium or as part of a computing architecture. FIG. 8 illustrates an embodiment of an exemplary computing architecture 236 suitable for implementing various embodiments as previously described. In one embodiment, the computing architecture 236 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 236. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 236 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 236.

As shown in FIG. 8, the computing architecture 236 comprises a processing unit 240, a system memory 242 and a system bus 244. The processing unit 240 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 240.

The system bus 244 provides an interface for system components including, but not limited to, the system memory 242 to the processing unit 240. The system bus 244 can be any of several types of bus structure that may further interconnect to a memory bus (with or without a memory controller), a peripheral bus, and a local bus using any of a variety of commercially available bus architectures. Interface adapters may connect to the system bus 244 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 236 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

Embodiments may also be at least partly implemented as instructions contained in or on a non-transitory computer-readable medium, which may be read and executed by one or more processors to enable performance of the operations described herein.

The system memory 242 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 242 can include non-volatile memory 246 and/or volatile memory 248. A basic input/output system (BIOS) can be stored in the non-volatile memory 246.

The computer 238 may include various types of computer-readable storage media in the form of one or more lower speed memory units, including an internal (or external) hard disk drive (HDD) 250, a magnetic floppy disk drive (FDD) 252 to read from or write to a removable magnetic disk 254, and an optical disk drive 256 to read from or write to a removable optical disk 258 (e.g., a CD-ROM or DVD). The HDD 250, FDD 252 and optical disk drive 256 can be connected to the system bus 244 by a HDD interface 260, an FDD interface 262 and an optical drive interface 264, respectively. The HDD interface 260 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 246, 248, including an operating system 266, one or more application programs 268, other program modules 270, and program data 272. In one embodiment, the one or more application programs 268, other program modules 270, and program data 272 can include, for example, the various applications and/or components of the system 30.

A user can enter commands and information into the computer 238 through one or more wire/wireless input devices, for example, a keyboard 274 and a pointing device, such as a mouse 276. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 278 that is coupled to the system bus 244, but can be connected by other interfaces such as a parallel port, IEEE 694 serial port, a game port, a USB port, an IR interface, and so forth.

A monitor 280 or other type of display device is also connected to the system bus 244 via an interface, such as a video adaptor 282. The monitor 280 may be internal or external to the computer 238. In addition to the monitor 280, a computer typically includes other peripheral output devices, such as speakers, printers, and so forth.

The computer 238 may operate in a networked environment using logical connections via wire and/or wireless communications to one or more remote computers, such as a remote computer 284. The remote computer 284 can be a workstation, a server computer, a router, a personal computer, portable computer, microprocessor-based entertainment appliance, a peer device or other common network node, and typically includes many or all of the elements described relative to the computer 238, although, for purposes of brevity, only a memory/storage device 286 is illustrated. The logical connections depicted include wire/wireless connectivity to a local area network (LAN) 288 and/or larger networks, for example, a wide area network (WAN) 290. Such LAN and WAN networking environments are commonplace in offices and companies, and facilitate enterprise-wide computer networks, such as intranets, all of which may connect to a global communications network, for example, the Internet.

When used in a LAN networking environment, the computer 238 is connected to the LAN 288 through a wire and/or wireless communication network interface or adaptor 292. The adaptor 292 can facilitate wire and/or wireless communications to the LAN 288, which may also include a wireless access point disposed thereon for communicating with the wireless functionality of the adaptor 292.

When used in a WAN networking environment, the computer 238 can include a modem 294, or is connected to a communications server on the WAN 290, or has other means for establishing communications over the WAN 290, such as by way of the Internet. The modem 294, which can be internal or external and a wire and/or wireless device, connects to the system bus 244 via the input device interface 278. In a networked environment, program modules depicted relative to the computer 238, or portions thereof, can be stored in the remote memory/storage device 286. It will be appreciated that the network connections shown are exemplary and other means of establishing a communications link between the computers can be used.

The computer 238 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   receiving a request at a translation system to translate source material from a source language into a destination language;
   translating the source material into destination material, the translating comprising:
      providing the source material to a translation model,
      identifying, with the translation model, a plurality of hypotheses representing translations of a source word or phrase into a destination word or phrase, the hypotheses comprising a first hypothesis and a second hypothesis different from the first hypothesis,
      outputting, from the translation model, a translation model score or rank for each of the plurality of hypotheses, wherein the first hypothesis has a higher translation model score or rank than the second hypothesis,
      evaluating, with a language model distinct from the translation model, the plurality of hypotheses in a context of the translated destination material,
      outputting, from the language model, a language model score or rank for each of the hypotheses, wherein the second hypothesis has a higher language model score or rank than the first hypothesis,
      combining, for each of the plurality of hypotheses, the translation model score or rank and the language model score or rank to select the first hypothesis or the second hypothesis as a most likely translation while identifying that the most likely translation is a questionable word or phrase based on the first hypothesis having a higher translation model score or rank and the second hypothesis having a higher language model score or rank; and
   displaying the destination material, the displaying comprising visually distinguishing the questionable words or phrases in the destination material by differentiating between the most-likely translation and other words or phrases in the destination material that were translated with high confidence.

2. The method of claim 1, wherein identifying the questionable words or phrases comprises determining whether the questionable words or phrases were encountered less than a predetermined threshold number of times in training data used to train the translation system.

3. The method of claim 1, wherein identifying the questionable words or phrases comprises:

encountering a source word or phrase in the source material during the translating;
generating two or more hypotheses representing possible translations of the source word or phrase into the destination language;
determining respective probabilities of the two or more hypotheses;
selecting a most-likely hypothesis; and
determining that the probability associated with the most-likely hypothesis is within a predetermined amount of a probability associated with another hypothesis.

4. The method of claim 1, further comprising:
identifying one or more non-questionable words or phrases in the destination material that were translated with high confidence; and
visually distinguishing the non-questionable words or phrases in the destination material.

5. The method of claim 1, further comprising:
presenting one or more alternatives for the questionable words or phrases.

6. The method of claim 5, further comprising:
receiving a selection of one of the alternatives; and
updating one or more models applied by the translation system based on the selected alternative.

7. A non-transitory computer-readable medium storing instructions that, when executed by one or more processors, cause the one or more processors to:
receive a request at a translation system to translate source material from a source language into a destination language;
translate the source material into destination material, the translating comprising:
providing the source material to a translation model,
identifying, with the translation model, a plurality of hypotheses representing translations of a source word or phrase into a destination word or phrase, the hypotheses comprising a first hypothesis and a second hypothesis different from the first hypothesis,
outputting, from the translation model, a translation model score or rank for each of the plurality of hypotheses, wherein the first hypothesis has a higher translation model score or rank than the second hypothesis,
evaluating, with a language model distinct from the translation model, the plurality of hypotheses in a context of the translated destination material,
outputting, from the language model, a language model score or rank for each of the hypotheses, wherein the second hypothesis has a higher language model score or rank than the first hypothesis,
combining, for each of the plurality of hypotheses, the translation model score or rank and the language model score or rank to select the first hypothesis or the second hypothesis as a most likely translation while identifying that the most likely translation is a questionable word or phrase based on the first hypothesis having a higher translation model score or rank and the second hypothesis having a higher language model score or rank; and
display the destination material, the displaying comprising visually distinguishing the questionable words or phrases in the destination material by differentiating between the most-likely translation and other words or phrases in the destination material that were translated with high confidence.

8. The medium of claim 7, comprising instructions to determine whether the questionable words or phrases were encountered less than a predetermined threshold number of times in training data used to train the translation system.

9. The medium of claim 7, comprising instructions to:
encounter a source word or phrase in the source material during the translating;
generate two or more hypotheses representing possible translations of the source word or phrase into the destination language;
determine respective probabilities of the two or more hypotheses;
select a most-likely hypothesis; and
determine that the probability associated with the most-likely hypothesis is within a predetermined amount of a probability associated with another hypothesis.

10. The medium of claim 7, comprising instructions to:
identify one or more non-questionable words or phrases in the destination material that were translated with high confidence; and
visually distinguish the non-questionable words or phrases in the destination material.

11. The medium of claim 7, comprising instructions to present one or more alternatives for the questionable words or phrases.

12. The medium of claim 7, comprising instructions to:
receive a selection of one of the alternatives; and
update one or more models applied by the translation system based on the selected alternative.

13. An apparatus comprising:
a network adapter configured to receive a request to translate source material from a source language into a destination language;
translation system logic, at least a portion of which is implemented in hardware, to implement a translation system, the translation system logic comprising logic to:
translate the source material into destination material, the translating comprising:
providing the source material to a translation model,
identifying, with the translation model, a plurality of hypotheses representing translations of a source word or phrase into a destination word or phrase, the hypotheses comprising a first hypothesis and a second hypothesis different from the first hypothesis,
outputting, from the translation model, a translation model score or rank for each of the plurality of hypotheses, wherein the first hypothesis has a higher translation model score or rank than the second hypothesis,
evaluating, with a language model distinct from the translation model, the plurality of hypotheses in a context of the translated destination material,
outputting, from the language model, a language model score or rank for each of the hypotheses, wherein the second hypothesis has a higher language model score or rank than the first hypothesis,
combining, for each of the plurality of hypotheses, the translation model score or rank and the language model score or rank to select the first hypothesis or the second hypothesis as a most likely translation while identifying that the most likely translation is a questionable word or phrase based on the first hypothesis having a higher translation model score or rank and the second hypothesis having a higher language model score or rank; and
display the destination material, the displaying comprising visually distinguishing the questionable words or phrases in the destination material by differentiating between the most-likely translation and other words or phrases in the destination material that were translated with high confidence.

14. The apparatus of claim 13, wherein the translation system logic is further configured to determine whether the questionable words or phrases were encountered less than a predetermined threshold number of times in training data used to train the translation system.

15. The apparatus of claim 13, wherein the translation system logic is further configured to:
   encounter a source word or phrase in the source material during the translating;
   generate two or more hypotheses representing possible translations of the source word or phrase into the destination language;
   determine respective probabilities of the two or more hypotheses;
   select a most-likely hypothesis; and
   determine that the probability associated with the most-likely hypothesis is within a predetermined amount of a probability associated with another hypothesis.

16. The apparatus of claim 13, wherein the video adapter is further configured to:
   present one or more alternatives for the questionable words or phrases.

17. The apparatus of claim 16, wherein the video adapter is further configured to:
   receive a selection of one of the alternatives; and
   update one or more models applied by the translation system based on the selected alternative.

18. The method of claim 1, wherein:
   the translation model score is based on the relative frequency in which the source word or phrase was translated into the respective hypothesis in bilingual training data used to train the translation model; and
   the language model score is based on the relative frequency in which the respective hypothesis was found in monolingual training data used to train the language model in a context corresponding to the context of the translated destination material.

* * * * *